United States Patent [19]

Nozawa

[11] 4,361,860
[45] Nov. 30, 1982

[54] MAGNETIC TRANSDUCER HEAD AND METHOD OF MANUFACTURING THE SAME

[75] Inventor: Kazuo Nozawa, Tagajo, Japan
[73] Assignee: Sony Corporation, Tokyo, Japan
[21] Appl. No.: 124,420
[22] Filed: Feb. 25, 1980
[30] Foreign Application Priority Data Feb. 28, 1979 [JP] Japan .................................. 54-22659

[51] Int. Cl.³ .............................................. G11B 5/251
[52] U.S. Cl. ................................................... 360/120
[58] Field of Search ................. 360/120, 119, 121–123

[56] References Cited

U.S. PATENT DOCUMENTS 3,795,954  3/1974  Alex et al. ....................... 360/120 X
4,048,714  9/1977  Huntt .............................. 360/120 X
4,182,643  1/1980  Calderon, Jr. et al. ......... 360/120 X

FOREIGN PATENT DOCUMENTS 54-105512  8/1979  Japan .................................. 360/120

Primary Examiner—John H. Wolff
Attorney, Agent, or Firm—Hill, Van Santen, Steadman, Chiara & Simpson

[57] ABSTRACT

A magnetic transducer head employing magnetic alloys as a core material and a method of manufacturing the same are disclosed. A pair of core blocks made of magnetic alloys are bonded together by a glass to form an effective gap therebetween. A thin metal layer is formed on the surface of the core blocks which results in a transition layer of the metal accompanied with oxide of the metal between the core block and the glass upon heat treatment for glass bonding to strengthen the bonding.

2 Claims, 5 Drawing Figures

MAGNETIC TRANSDUCER HEAD AND METHOD OF MANUFACTURING THE SAME

BACKGROUND OF THE INVENTION

1. Field of the Invention

The present invention relates to a magnetic transducer head used in a magnetic recording and/or playback apparatus, and method of manufacturing said magnetic transducer head.

2. Description of the Prior Art

In the prior art, a magnetic transducer head which is used in a magnetic recording and playback apparatus, for example in a video tape recorder, has such a construction that a pair of magnetic core blocks (1a) and (1b) shown in FIG. 1 are bonded together to form an operating magnetic gap g therebetween at a confronting surface (6) to a magnetic recording medium such as magnetic tape. The bonding of the blocks (1a) and (1b) is carried out by filling bonding material (3) in grooves (2) formed at both sides of the gap g and extending along the direction of gap depth, which restrict the width of the gap. In FIG. 1, there is provided a groove (4) for winding, through which a winding (5) is wound around the block (1a) to form a coil. In the magnetic transducer head of such construction, when the core blocks (1a) and (1b) are formed by magnetic ferrite, and the bonding material (3) is a glass, it is possible to carry out the bonding process well, which results in a high accuracy magnetic transducer head. The head thus manufactured is stable upon temperature deviation, and strong against mechanical processing such as cutting, grinding or polishing.

Recently it is necessary to use magnetic alloys, for example, Sendust alloys (Fe-Al-Si alloys), Super Sendust alloys (Fe-Al-Si-Ni alloys), Alperm alloys (Fe-Al alloys), Permalloys (Fe-Ni alloys) having a higher saturation magnetic induction than the ferrite, as a material for the core blocks, in response to the requirement of higher density magnetic recording. In case of bonding such core blocks formed of the above alloys by using a glass, there is such a drawback that clacks are formed in the glass upon mechanical processing, such as, cutting, or mechanical polishing applied to the bonded core blocks. Therefore, in the prior art, organic adhesives or metal solder are used for bonding core blocks made of the alloys, however, the organic adhesives are not stable upon the temperature change and deteriorated by aging, while the metal solder is an electrically conductive material which results in decrease in output caused by an eddy current loss.

OBJECT AND SUMMARY OF THE INVENTION

It is an object of the present invention to provide an improved magnetic transducer head suitable for high density magnetic recording.

It is another object of the present invention to provide an improved magnetic transducer head using magnetic alloys as a core material.

It is a further object of the present invention to provide an improved magnetic transducer head using magnetic alloys as a core material bonded by a glass.

It is a still further object of the present invention to provide a method of manufacturing a magnetic transducer head employing magnetic alloys as core material by glass bonding technique.

According to one aspect of the present invention there is provided a magnetic transducer head comprising a pair of core blocks made of magnetic alloy, an effective magnetic gap between said core blocks, glass bonding said core blocks together and a winding around at least one of said core blocks, said head characterized in having a transition layer of a metal accompanied with an oxide of said metal between a surface of said core blocks and said glass.

According to another aspect of the present invention there is provided a method of manufacturing a magnetic transducer head comprising the steps of preparing a pair of core blocks made of magnetic alloy, forming a plurality of grooves extending parallel in one direction on one surface of at least one of said core blocks, forming a groove extending substantially transverse to said plurality of grooves on one surface of at least one of said core blocks, depositing a metal layer in said grooves, facing said pair of core blocks to form a gap between said one surfaces, bonding said core blocks by filling said plurality of grooves with glass, dividing said bonded core blocks into a plurality core element, forming a winding through said groove around said core elements.

DESCRIPTION OF THE PREFERRED EMBODIMENTS

The present invention will be hereinafter described with reference to the accompanying drawings.

Figure 1:
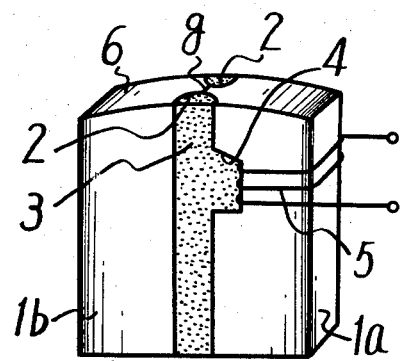
FIG. 1 is an enlarged perspective view showing prior art magnetic transducer head.
Figure 2:
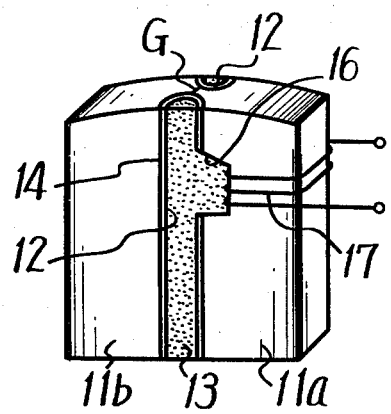
FIG. 2 is an enlarged perspective view showing an example of a magnetic transducer head according to the present invention.

In the present invention each of core halves (11a) and (11b) in FIG. 2 is formed of magnetic alloys such as Fe-Al-Si alloys (so-called Sendust alloys), Fe-Ni-Al-Si alloys (so-called Super Sendust alloys), Fe-Al alloys (so-called Alperm), Fe-Ni alloys (so-called Permalloys), or the above alloys further containing Cr to improve wear resistance and containing small amount of additional elements to improve various characteristics of the alloys. The core halves (11a) and (11b) are melt bonded together by glass (13) to form an operating magnetic gap G at a side of the tape travelling surface. A transition layer (14) composed of a metal accompanied with an oxide of the metal is formed between the core blocks (11a) and (11b) and the glass (13). A metal layer is deposited on a surface of the core block to be bonded by the glass, for example on the surface in the track width restricting grooves (12) which are provided at both sides of the operating magnetic gap G, and on the surface in the groove for a winding (16) which is provided on one of the core blocks (11a), and the metal layer is diffused into the glass (13) and the core halves (11a) and (11b) upon heat treatment for the glass bonding. Then the transition layer (14) composed of the metal accompanied with the oxide of the metal is formed between the core halves (11a) and (11b) and the glass (13). For the metal to form the transition layer (14), it is necessary that the metal is easily wet by the glass. It is also desirable that the metal layer has a thermal expansion coefficient not more than $200 \times 10^{-7}/°C$. which is corresponding to the thermal expansion coefficient of the magnetic alloys, and Mohs hardness not less than 3.0.

Examples of suitable metals are Cr, Cu, Mo, Fe, Ti, W, and Ni. The reason why the Mohs hardness of the metal is selected not less than 3.0 is to avoid localized wear at the metal layer on the tape travelling surface upon running of the magnetic recording medium. The metal layer can be deposited by sputtering, vacuum evaporation, ion plating, electroplating or electroless plating. The thickness of the metal layer is selected in the range from 500 Å to 50 μm, and more preferably 1000 Å to 5 μm. If the thickness is too thin the metal layer is completely diffused into the glass and the cores upon heat treatment for the glass bonding and no transition layer remains which does not strengthen the bonding between the cores and the glass. If the thickness is too thick, too thick layer of the metal remains between the cores and the glass after the glass bonding, and there is a possiblity of ununiform wear on the tape travelling surface caused by the difference of the hardness between the core material and the metal. Further the metal layer is electrically conductive which causes the eddy current loss. The metal layer is not restricted to be formed by a single metal layer, but it may be formed by superposed layers, for example, the first layer of Cu on the core, and the second layer of Ni formed on the Cu layer.

While, it is desirable to use a glass containing an additional material which form oxide precipitates by chemical bond with an oxygen in the glass.

The fine precipitates can disperse the stress in the glass and strengthen the glass. The additional material may be selected from Cu, $Cu_2O$, Sb, Mo, Sn, and La. The preferred amount of such additives is in the range from 2 to 20 weight % based on 100 weight % of the glass. The additional material to the glass is desirably selected from a material containing same chemical element as the metal to form the transition layer. In FIG. 2, numeral (17) designate a coil wound through the groove (16).

For the better understanding, the present invention will be explained with a specific example.

EXAMPLE 1

Figure 3:
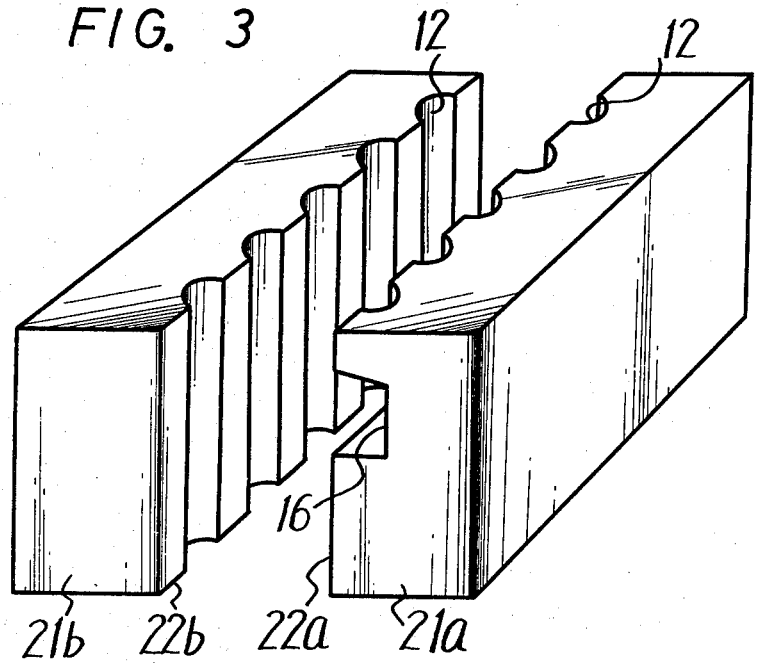
FIGS. 3 to 5 are drawings used for explaining a method of manufacturing a magnetic transducer head according to the present invention.
Figure 4:
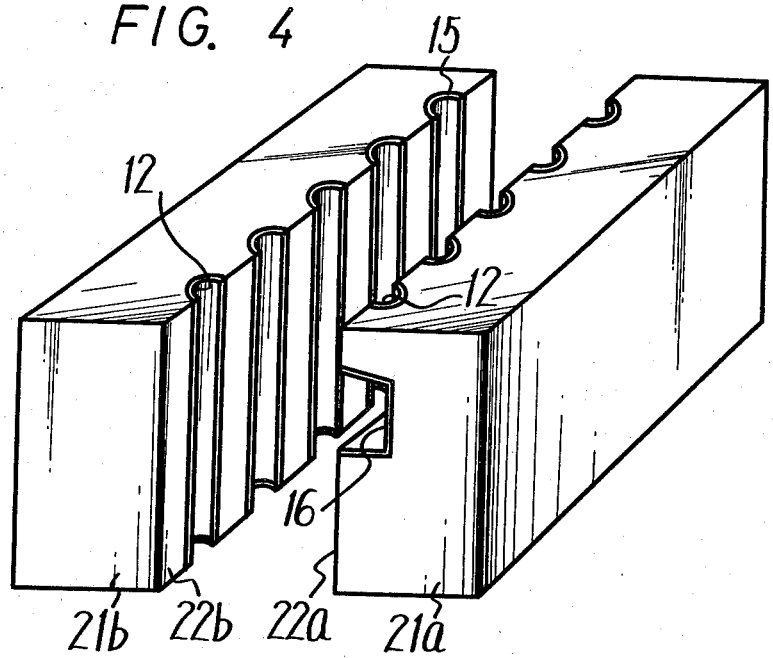
Figure 5:
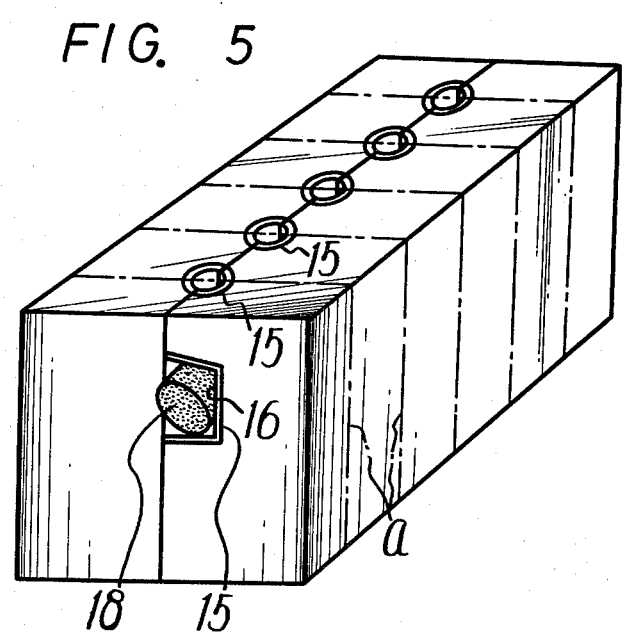

As shown in FIG. 3, a pair of core blocks (21a) and (21b) were prepared which were made of magnetic alloy such as Sendust alloys. A plurality of grooves (12) for restricting the track width extending parallel with each other were formed on at least one of the confronting surfaces (22a) and (22b) of the core blocks (21a) and (21b), though the grooves (12) were formed on both surfaces at corresponding position with each other in the example of FIG. 3. A groove (16) for a winding was formed on the surface (22a) of the core block (21a) extending transverse to the grooves (12). These grooves can be formed by mechanical processing, electrolytic etching and so on. Next as shown in FIG. 4 metal layer (15) made of Cu, having a thickness of 3 μm was formed by chemical plating in the grooves for restricting track width (12) and the groove for the winding (16). Then a layer of non magnetic material such as $SiO_2$ having a predetermined thickness, though it is not shown in FIG. 4, was sputtered on one of the confronting surfaces (22a) or (22b) which defines a gap length of the magnetic transducer heads. Next as shown in FIG. 5 the core blocks (21a) and (21b) were held together, and a glass rod (18) was placed in the groove (16). The glass rod may be formed of a glass containing 30 weight % of PbO, 15 weight % of $B_2O_3$, 10 weight % of ZnO, 40 weight % of $SiO_2$ and 5 weight % of $Al_2O_3$. Then the glass rod was melted under for example $N_2$ atmosphere at 800° C. so as to flow into the track width restricting grooves (12), and then cooled. Thus the blocks were bonded together by the glass. Between the cores and the glass, there was formed a transition layer of the metal accompanied with an oxide of the metal. After that, the blocks were divided along broken lines a transversing the track width restricting grooves (12) to make an individual head core. A winding was wound through the groove (16), and the tape running surface was polished to complete the magnetic transducer head of the present invention shown in FIG. 2.

Thus formed magnetic transducer head of the present invention was stable in its characteristics, since the both core blocks (21a) and (21b) or the both core halves (11a) and (11b) were tightly bonded together by the glass (13), no displacement between the core halves (11a) and (11b) and no rubbing off of the glass appeared upon the above described mechanical processing such as cutting or polishing after the melt bonding by the glass. The reason that the core blocks were tightly bonded was that the mutual diffusion of the core material and Cu of the metal layer (15) occured at the interface between the core halves (11a) and (11b) and the metal layer (15), and the diffusion of Cu into the glass occured at the interface of the glass (13) and the metal layer (15) to form a roughed interface with fine roughness, both strengthened the bonding.

Another example of the present invention will now hereinafter described.

EXAMPLE 2

The similar process to example 1 was carried out except the material of the glass rod (18) used for the glass bonding. The glass rod (18) used in this example was prepared by melting a glass composed 30 weight % of PbO, 15 weight % of $B_2O_3$, 10 weight % of ZnO, 40 weight % of $SiO_2$, and 5 weight % of $Al_2O_3$ added with 10 weight percent Cu powder under the $N_2$ atmosphere. The glass rod (18) thus prepared was placed in the groove (16), and the glass bonding was carried out under $N_2$ atmosphere at 800° C., and the magnetic transducer head was cut out from the bonded blocks. The core halves of the magnetic transducer head thus prepared was more tightly bonded. There was formed transition layer of Cu metal with $Cu_2O$ particles at the interface between the cores and the glass. And in the glass, fine particles of oxide of copper was dispersed with decreased concentration as the distance from the core increased. It is considered that the transition layer and the precipitated particles of oxide of copper effectively dispersed the strain stored in the glass upon the mechanical processing after melt-bonding by the glass.

As mentioned above, the magnetic transducer head according to the present invention is manufactured by bonding the core halves (11a) and (11b) by the glass, it is possible to avoid the drawbacks of the prior art magnetic head, such as the temperature instability in case of bonding by organic adhesives, or the eddy current loss in case of bonding by metal solders.

The invention was explained with an example of bonding a pair of core blocks to form a magnetic circuit. However the invention is also applicable to the glass bonding of a magnetic head element and a masking core for the purpose of magnetically shielding. Further it is applicable to laminate plates of magnetic alloy by the glass.

I claim as my invention:

1. A magnetic transducer head comprising a pair of core blocks made of magnetic alloy, an effective magnetic gap between said core blocks, glass bonding said core blocks together and a winding around at least one of said core blocks, a transition layer of a metal accompanied with an oxide of said metal between the surfaces of both of said pair of core blocks and said glass, and further comprising a pair of grooves formed at one end of said gap in the direction of a track width extending along the depth of said gap, said grooves being filled with said glass and said transition layer of metal formed on the surfaces of said grooves so as to be between said glass and both of said pair of core blocks and wherein said transition layer of metal is selected from the group consisting of Cu, Mo, T, and W and said glass containing PbO, $B_2O_3$, ZnO, $Al_2O_3$ and $SiO_2$.

2. A magnetic transducer according to claim 1 wherein said glass contains CuO.

* * * * *